United States Patent
Renner et al.

[11] 3,883,155
[45] May 13, 1975

[54] PROTECTIVE PADDING ESPECIALLY FOR THE BACKREST AND HEADREST IN A MOTOR VEHICLE

[75] Inventors: Hermann Renner, Magstadt; Gerhard Busch, Gechingen, both of Germany

[73] Assignee: Daimler-Benz Aktiengesellschaft, Germany

[22] Filed: June 26, 1972

[21] Appl. No.: 265,988

[30] Foreign Application Priority Data
June 26, 1971 Germany............................ 02131970

[52] U.S. Cl. ............................... 280/150 B; 180/90
[51] Int. Cl. ........................................... B60r 21/10
[58] Field of Search .................... 280/150 B; 180/90

[56] References Cited
UNITED STATES PATENTS

| | | | |
|---|---|---|---|
| 2,070,760 | 2/1937 | Straith | 280/150 B |
| 2,088,787 | 8/1937 | Gregorie | 180/90 |
| 2,844,387 | 7/1958 | Shaw | 280/150 B |
| 3,043,608 | 7/1962 | Farlee | 280/150 B |
| 3,377,082 | 4/1968 | Saunders | 280/150 B |
| 3,468,556 | 9/1969 | Smith | 280/150 B |
| 3,560,041 | 2/1971 | Foster | 290/150 B |
| 3,632,132 | 1/1972 | Richardson | 180/90 |
| 3,650,223 | 3/1972 | Yabori | 280/150 B |

FOREIGN PATENTS OR APPLICATIONS

| | | | |
|---|---|---|---|
| 1,630,981 | 3/1971 | Germany | |
| 1,948,970 | 6/1970 | Germany | 280/150 AB |
| 264,159 | 12/1964 | Australia | 280/150 B |

Primary Examiner—Kenneth H. Betts
Assistant Examiner—Jack D. Rubenstein
Attorney, Agent, or Firm—Craig & Antonelli

[57] ABSTRACT

A protective padding that consists of an outer zone made of elastic material with high damping properties and a closed outer covering as well as of an inner zone which plastically deforms under energy absorption when a predetermined load is exceeded, particularly for covering backrests and headrests in motor vehicles equipped with front bucket seats whereby the protective padding forms a unit extending over the entire width of the interior space which is supported at door columns and/or inner walls and is connected with the central area of the instrument panel by way of an approximately U-shaped bearer member that rests on the vehicle floor or Cardan tunnel.

35 Claims, 2 Drawing Figures

PATENTED MAY 13 1975 3,883,155
FIG.1
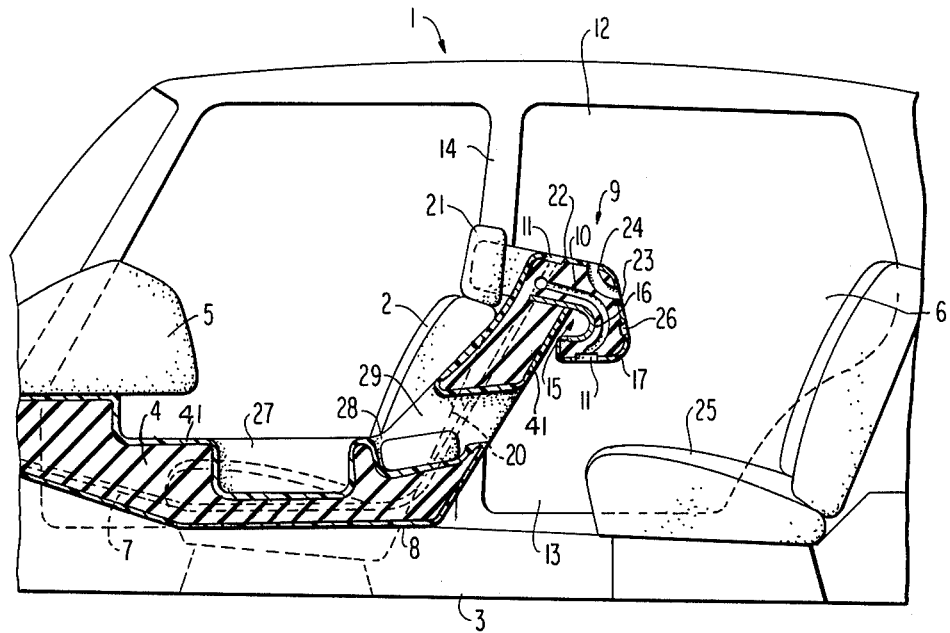
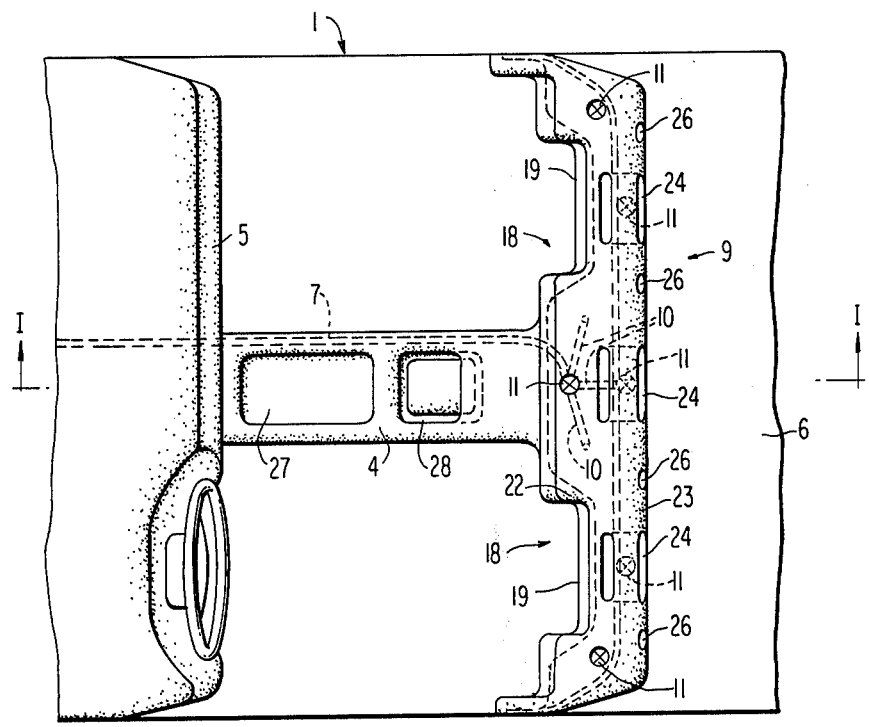
FIG.2

PROTECTIVE PADDING ESPECIALLY FOR THE BACKREST AND HEADREST IN A MOTOR VEHICLE

The present invention relates to a protective padding with an outer zone of an elastic material having high damping properties and a closed outer covering, as well as with an inner zone which plastically deforms when exceeding a predetermined load under energy absorption, especially for the cover of the backrest and headrests in motor vehicles with front bucket seats.

Such a protective padding is already described in the German Offenlegungsschrift 1,630,981, which is limited, however, only to the upper backrest part and forms a unitary or integral part therewith. In an embodiment with headrest, the same also includes a construction which absorbs a rearward impact while producing a deformation work. It is thereby disadvantageous, inter alia, that a change of the seat position and of the position of the headrests also leads to a change of the free path up to the impact surface. Especially with a differing position of driver and co-driver seat, non-padded transitions result which jeopardize the protective effectiveness of the padding.

Furthermore, a bench fitted in the form of a padded cushion or buffer behind the front seat of the vehicle is described in the German Offenlegungsschrift 1,948,970 which preferably, however, forms a unit with the seating part. Hence, the proposal of this Offenlegungsschrift can be realized only in a vehicle with a front seat bench.

It is the aim of the present invention to provide a protective padding, especially for motor vehicles with individual or bucket front seats which is so constructed that in case of a seat adjustment, the free path up to the impact surface always remains the same and which can be installed subsequently at any time into older vehicles.

Accordingly, a protective padding of the aforementioned type is proposed in which according to the present invention, the protective padding forms a unit extending over the entire width of the interior space, preferably supported at the door columns and/or inner walls and is in connection with the central area of the instrument panel by way of an approximately U-shaped bearer member resting on the vehicle floor or Cardan tunnel.

According to a further feature of the present invention, an essentially U-shaped metal or plastic material profile member is provided within the area of the lower edge of the protective padding which is torsion-resistant in the vehicle transverse direction, is deformable in the impact direction and is surrounded with foamed material.

The seat-adjusting range can be fully utilized if the backside of the protective padding is provided with indentations matched to the profile of the backrests and/or headrests.

In a preferred embodiment of the present invention, air discharge apertures adapted to be closed and directed toward the roof space and floor space are embedded in the outer zone, which air discharge apertures are in communication with each other by way of lines and are connected with the remaining heating and ventilation system by way of a channel or duct extending through the bearer member in proximity to its outer wall facing the vehicle floor or Cardan tunnel.

For purposes of increasing the internal safety, approximately shell-shaped handles coordinated to the seating position of the passengers on the rear seats are provided in the outer zone, preferably embedded or inset in the transitional area between top side and the obliquely falling front side of the protective padding.

Appropriately, the handles are formed from the material of the outer zone.

The construction of the protective padding according to the present invention permits in a simple manner that the outer zone accommodates reading lights which are arranged recessed, are accessible to the rear passengers and do not blind the driver.

In a preferred embodiment of the present invention, trays for storing, for example, maps and first-aid material are inset or embedded in the bearer.

A free access to the first-aid material by all passengers is achieved if adjoining the tray receiving the first-aid material a connection exists to the rear space.

Accordingly, it is an object of the present invention to provide a protective padding which avoids by simple means the aforementioned shortcomings and drawbacks encountered in the prior art.

Another object of the present invention resides in a protective padding, especially for substantially surrounding the backrests and headrests in motor vehicles, which is independent of the seat adjustment of the front bucket seats as regards the free distance to the impact surface.

A further object of the present invention resides in a protective padding structure which further increases the internal safety.

Still another object of the present invention resides in a protective padding of the type described above which greatly increases the comfort for the rear seat passengers by the incorporation of handles, heating and ventilating outlets and/or reading lamps.

These and other objects, features, and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view taken along line I—I of FIG. 2 through a protective padding with a bearer adjoining the same according to the present invention; and FIG. 2 is a simplified plan view of the protective padding arrangement of FIG. 1.

Referring now to the drawing wherein like reference numerals are used to designate like parts in the two views, a schematically illustrated motor vehicle generally designated by reference numeral 1 accommodates between its front seats 2—of which only the right front seat 2 is illustrated in outline—a bearer member 4 resting on the Cardan tunnel 3 and preferably consisting of a conventional foamed plastic material, for example, of conventional synthetic resinous foamed material. The bearer member 4 is constructed approximately U-shaped whereby its shorter leg portion is in connection with the central portion of the instrument panel 5 whereas its longer leg portion extends between the front seats 2 constituted by bucket seats obliquely toward the rear space 6. A channel or duct 7 which extends in proximity to the outer wall 8 of the bearer member 4 facing the Cardan tunnel 3, is in communication with the heating and ventilating system (not shown) and leads to a protective padding generally designated by reference numeral 9 and supported or mounted on the bearer member 4. A branching of the channel 7 into individual lines 10 takes place in the protective padding 9 which lead in a manner not fully illustrated to air discharge apertures 11 adapted to be closed. The discharge apertures 11 are embedded or recessed in the protective padding 9 and are directed toward the roof space 12 and the leg space 13.

The protective padding 9 which extends over the entire width of the vehicle interior space is rigidly connected with the door columns 14 by conventional means. However, it is also possible only to support the protective padding 9 at the door columns 14 and/or the interior walls of the vehicle if the bearer member 4 is rigidly connected with the protective padding 9 or forms a unitary structure therewith. An inner zone is created by a metal or synthetic plastic profile member 16 of approximately U-shaped construction which is relatively torsion-resistant in the vehicle transverse direction within the area of its lower or bottom edge 15, yet is deformable in the impact direction; this inner zone is plastically deformed when exceeding a predetermined load with energy absorption. This metal or plastic profile member 16 is surrounded by an outer foamed zone 17 which consists of an elastic material having high damping made, for example, from any known synthetic resinous material and includes a conventional closed outer covering 41.

As can be seen in particular from FIG. 2, the backside 18 of the protective padding 9, i.e., the side facing the front of the vehicle, is provided with indentations or recesses 19 that are matched to the profile of the backrests 20 and/or of the headrests 21. As a result thereof, the seat and headrest-adjusting range remains preserved to the full extent.

Gripping handles 24 are embedded or inset in the transition range between the top side 22 and the obliquely dropping front side 23 within the outer zone 17. The handles 24 thereby extend through the outer zone approximately dish-shaped. The arrangement is thereby so selected that one handle 24 each is coordinated to the passengers on the rear seats 25 which, in the illustrated embodiment of the present invention is constituted from the material of the outer zone 17. Furthermore, reading lamps 26 are embedded within this zone 17 that do not blind the driver and which can be easily reached by the passengers in the rear space 6.

The bearer 4 is provided with trays 27 and 28 which are suited for receiving or storing, for example, maps and first-aid material. The tray 28 preferably containing the first-aid material includes a connection 29 to the rear space 6 through which also the passengers on the rear seats 25 have access at any time to the first-aid material.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A protective padding arrangement for vehicles having an interior space with an instrument panel and adjustable seats disposed in a front portion thereof and rear seat means disposed in a rear portion thereof, the arrangement comprising: padding means disposed in the interior space rearwardly of the adjustable seats and extending substantially over the entire width of the interior space, said padding means being mounted independently of the adjustable seats in the interior space to maintain the distance between the padding means and the rear seat means constant regardless of the adjustment of the adjustable seats, said padding means including a substantially U-shaped means extending between the adjustable seats toward the front of the interior space for connection with the instrument panel substantially in the central area thereof, an outer zone of elastic material having high damping properties, a closed outer covering, and an inner zone which plastically deforms with energy absorption upon exceeding a predetermined load.

2. A protective padding arrangement according to claim 1, wherein the vehicle includes a floor, and wherein said U-shaped means rests on a part of the vehicle floor 3. A protective padding arrangement according to claim 2, wherein the vehicle includes a Cardan tunnel and wherein said U-shaped means rests on the Cardan tunnel.

4. A protective padding arrangement according to claim 3, wherein the adjustable seats are front bucket seats having backrests and headrests, and wherein said padding means substantially surrounds the backrests and the headrests.

5. A protective padding arrangement according to claim 4, wherein said padding means is provided with a lower edge portion, and said inner zone includes an approximately U-shaped profile means provided within the area of the lower edge portion, said profile means being relatively torsion-resistant in the vehicle transverse direction and deformable in the impact direction.

6. A protective padding arrangement according to claim 5, wherein said outer zone surrounds said profile means, said outer zone consisting of foamed material.

7. A protective padding arrangement according to claim 6, wherein said profile means consists of a metallic material.

8. A protective padding arrangement according to claim 6, wherein the backside of said padding means is provided with indentations matched to the profile of corresponding parts of the front seats.

9. A protective padding arrangement according to claim 6, wherein said profile means consists of a plastic material.

10. A protective padding arrangement according to claim 8, wherein said corresponding parts include the backrests and the headrests.

11. A protective padding arrangement according to claim 7, wherein the backside of said padding means is provided with indentations matched to the profile of the backrests and headrests of the front bucket seats.

12. A protective padding arrangement according to claim 11, wherein the vehicle includes a heating and ventilating system and the interior space includes a roof space portion and a leg space portion, and wherein selectively closeable discharge aperture means are embedded in the outer zone of elastic material, said discharge aperture means being substantially directed toward the roof space portion and the leg space portion of the interior space, line means for communicating said discharge aperture means with each other, and means for communicating said discharge aperture means with the heating and ventilating system of the vehicle including a channel extending through said U-shaped means in proximity to its outer wall facing the vehicle floor part on which said U-shaped means rests.

13. A protective padding arrangement according to claim 12, wherein approximately dish-shaped handles are provided in the outer zone of elastic material coordinated to the seating position of passengers on the rear seat means.

14. A protective padding arrangement according to claim 13, wherein said padding means includes a top side and an obliquely dropping front side, and said handles are provided in a transition area between said top side and said obliquely dropping front side.

15. A protective padding arrangement according to claim 14, wherein said handles are constituted from the material of the outer zone.

16. A protective padding arrangement according to claim 15, wherein recessed reading lamps accessible to the rear passengers which do not blind the driver are provided in the outer zone of elastic material.

17. A protective padding arrangement according to claim 16, wherein in said tray means are formed in said U-shaped means.

18. A protective padding arrangement according to claim 17, wherein means are provided for communicating said tray means with the rear of the interior space, said communicating means including an extension of the tray means closest to the rear of the interior space.

19. A protective padding arrangement according to claim 1, wherein said padding means is provided with a lower edge portion, and said inner zone includes an approximately U-shaped profile means provided, within the area of the lower edge portion, said profile means being relatively torsion-resistant in the vehicle transverse direction and deformable in the impact direction.

20. A protective padding arrangement according to claim 19, wherein said outer zone surrounds said profile means, said outer zone consisting of foamed material.

21. A protective padding arrangement according to claim 1, wherein the backside of said padding means is provided with indentations matched to the profile of corresponding parts of the front seats.

22. A protective padding arrangement according to claim 1, wherein the backside of said padding means is provided with indentations matched to the profile of the backrests and headrests of the front seats.

23. A protective padding arrangement according to claim 1, wherein the vehicle includes a heating and ventilating system and the interior space includes a roof space portion and a leg space portion, and wherein selectively closeable discharge aperture means are embedded in the outer zone of elastic material, said discharge aperture means being substantially directed toward the roof space portion and the leg space portion of the interior space, line means for communicating said discharge aperture means with each other and means for communicating said discharge aperture means with the heating and ventilating system of the vehicle including a channel extending through said U-shaped means in proximity to its outer wall facing the vehicle floor part on which said U-shaped means rests.

24. A protective padding arrangement according to claim 1, wherein approximately dish-shaped handles are provided in the outer zone of elastic material coordinated to the seating position of passengers on the rear seat means.

25. A protective padding arrangement according to claim 24, wherein said padding means includes a top side and an obliquely dropping front side, and wherein said handles are provided in a transition area between said top side and said obliquely dropping front side.

26. A protective padding arrangement according to claim 24, wherein said handles are constituted from the material of the outer zone.

27. A protective padding arrangement according to claim 1, wherein recessed reading lamps accessible to the rear passengers which do not blind the driver are provided in the outer zone of elastic material.

28. A protective padding arrangement according to claim 1, wherein inset tray means are formed in said U-shaped means.

29. A protective padding arrangement according to claim 28, wherein means are provided for communicating said tray means with the rear of the interior space, said communicating means including an extension of the tray means closest to the rear of the interior space.

30. A protective arrangement for vehicles having an interior space with a front interior space having adjustable front seat means disposed therein and a rear interior space portion having rear seat means disposed therein, and with a fixed vehicle part disposed within the front interior space portion, said arrangement comprising: padding means extending substantially along the entire width of the interior space between the front interior space portion and the rear interior space portion, said padding means being mounted independently of the adjustable front seat means to maintain a fixed distance between the adjustable front seat means and the rear seat means regardless of the adjustment of the adjustable front seat means, said padding means including a substantially U-shaped member extending into the front interior space portion for connection with the fixed vehicle part.

31. A protective arrangement according to claim 30, wherein said padding means further includes means for plastically deforming upon exceeding a predetermined impact load.

32. A protective arrangement according to claim 31, wherein said plastically deforming means includes a substantially U-shaped profile means extending substantially along the entire width of the interior space.

33. A protective arrangement according to claim 32, wherein the adjustable front seat means includes bucket seats, and said U-shaped member is disposed between said bucket seats.

34. A protective arrangement according to claim 33, wherein the fixed vehicle part is an instrument panel.

35. A protective arrangement according to claim 34, wherein said padding means is contoured to accommodate said bucket seats.

* * * * *